United States Patent [19]

Akiyama

[11] 4,071,373

[45] Jan. 31, 1978

[54] PROCESS FOR THE MANUFACTURE OF ALUMINOUS CEMENT FROM ALUMINUM SMELTING RESIDUE

[75] Inventor: Keiichi Akiyama, Tokyo, Japan

[73] Assignee: Aluminum Alloy Refiners Association, Tokyo, Japan; a part interest

[21] Appl. No.: 702,648

[22] Filed: July 6, 1976

[51] Int. Cl.$^2$ ............................................. C04B 7/32
[52] U.S. Cl. .................................................. 106/104
[58] Field of Search ................................. 106/104, 103

[56] References Cited

U.S. PATENT DOCUMENTS

| 1,853,406 | 4/1932 | Carothers et al. | 106/104 |
| 2,099,176 | 11/1937 | Scripture | 106/104 |
| 2,859,124 | 11/1958 | King | 106/104 |
| 3,944,426 | 3/1976 | Nickelsen et al. | 106/104 |

Primary Examiner—J. Poer
Attorney, Agent, or Firm—Frank J. Jordan

[57] ABSTRACT

A process for the manufacture of aluminous cement from aluminum smelting residue and the novel resulting cement are provided. According to the process, a mixture of predetermined amounts of aluminum smelting residue, limestone, aluminum siliceous clay, and, if necessary, fluorite and manganese ore for the acceleration of oxidation, is prepared and the mixture is finely crushed and then burned at temperatures between 1,300° C and 1,500° C to form a clinker which is then powered to produce an aluminous cement of excellent quality. The product contains no harmful chemical compositons that tend to become a source of public hazards such as air or water pollution.

3 Claims, No Drawings ically fused method in which a state of oxidation is brought about
PROCESS FOR THE MANUFACTURE OF ALUMINOUS CEMENT FROM ALUMINUM SMELTING RESIDUE

BACKGROUND OF THE INVENTION

The present invention relates to a process for the manufacture of aluminous cement from aluminum smelting residue admixed with other suitable materials and to the novel resulting cement.

The conventional aluminous cement has been manufactured in such a manner that bauxite or other suitable materials containing more than 50% $Al_2O_3$ are mixed with limestone and the mixture is processed in an electric or reverberatory furnace. All proportions herein are by weight.

On the other hand, aluminum smelting residue as a by-product in the aluminum industry has usually been disposed of as waste material. However, since it contains some harmful chemical compounds such as aluminum nitride and aluminum carbide, which are liable to become a source of public hazards including air or water pollution, the proper disposal thereof has now become a matter of primary concern.

As a result of investigation of such residue, the present inventor has found that it is possible to manufacture aluminous cement therefrom and, further, that in the process of its manufacture, all of the aforementioned harmful chemical compounds contained in the residue are oxidized and, as a result, innocuous oxides and, in the case of aluminum nitride, nitrogen are generated. The reason for this is that the aluminum smelting residue contains as a main component thereof about 80% $Al_2O_3$ in addition to aluminum nitride, aluminum carbide, zinc, tin, magnesium, vanadium, titanium, etc. and is essentially different in quality from bauxite as a natural raw material.

Referring to bauxite, there are a variety of kinds, but it may be roughly divided into two kinds, namely red and white. The former contains much ferric oxide, sometimes reaching as much as 20%, while the latter contains same as little as 2 to 8% ferric oxide, together with a comparatively small amount of $SiO_2$, sometimes reaching as much as 20%. Since inclusion of $SiO_2$ is to be avoided in smelting metallic aluminum, red bauxite is used as a basic material and ferric oxide contained therein is removed therefrom as a red slurry to thereby produce pure alumina for smelting to metallic aluminum. Accordingly, little $SiO_2$ and iron are contained in the aluminum residue.

In this connection, reference is made to "the aluminous cement for refractory materials" of the Japan Industrial Standard R2511-1961, from which it will be seen that the allowable content of $Al_2O_3$ in the first class of such cement is more than 50% and more than 35% in the second class, $Fe_2O_3$ is below 3% in the first class and below 10% in the second class and CaO is below 40% in both classes but no standards are given regarding $SiO_2$ content. However, as a result of investigation by the present inventor, it has been found that inclusion of up to about 15% $SiO_2$ and/or up to about 15% $Fe_2O_3$ in aluminous cement is permissible and that these ingredients in proportions below 15% can improve the efficiency of the cement.

On the other hand, as a matter of practice, the conventional aluminous cement contains little $SiO_2$ or $Fe_2O_3$ since it is manufactured by an electrical fusing method in which a state of oxidation is brought about such that ferric oxide and $SiO_2$ contained in the batch are reacted to produce ferrosilicon, which is then separated from the components of the cement. Likewise, in the case of the recently developed reverberatory furnace being employed, with which a fusing method is effected, a state of natural reduction is brought about and iron and silica are combined to generate ferrosilicate, which tends to separate from the cement.

SUMMARY OF THE INVENTION

An object of the present invention is to provide a process for the manufacture of aluminous cement from aluminum smelting residue admixed with other suitable materials.

Another object of the present invention is to provide a process for the manufacture of aluminous cement in a safe and economical manner from aluminum smelting residue which has hitherto been disposed of as waste material.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments.

DESCRIPTION OF THE PREFERRED EMBODIMENTS

The process according to the present invention comprises the steps of preparing a mixture of predetermined amounts of aluminum smelting residue as a main component thereof, limestone, aluminum siliceous clay and, if necessary, fluorite and manganese ore as accelerators for oxidation, crushing the mixture finely, burning and then powdering same to thereby manufacture an aluminous cement of excellent quality.

The process according to the present invention has various advantages. Unlike in the case of the use of an electric or reverberatory furnace, since the process of the invention is carried out under oxidation conditions by a burning method, silica and iron are not separated from the components of the cement. Further, since the crushed mixture is not fused but burned at temperatures between 1,300° C and 1,500° C, the fuel consumption can be minimized. Moreover, dut to the inclusion of $SiO_2$ and $Fe_2O_3$ in the cement, the efficiency of the cement is greatly increased. In this connection, it is believed that although the aluminum smelting residue contains only a small amount of iron, it is unnecessary to add $SiO_2$ and $Fe_2O_3$ on purpose. However, because these compounds serve to make a cement of excellent quality, a wide range of selection of mixing materials is provided in the present invention so that the amount of the aluminum smelting residue used may be minimized.

It is to be noted that although there are contained in the residue aluminum nitride and aluminum carbide, which tend to become a source of public hazards as mentioned above, since water is not used in the present process, there is no fear of these compounds reacting to generate ammonia and hydrocarbon gases. In order to prevent these compounds from possibly remaining in the cement and generating harmful gases when the cement is mixed with water, it is necessary to convert them to $Al_2O_3$. For this purpose, in the present process, limestone is added to the residue and the mixture is burned at temperatures between 1,300° C and 1,500° C, whereby the compounds are reacted to thereby disappear according to the following equations:

$$2AlN + 4MnO + 6O_2 \rightarrow 2Al(MnO_4)_2 + N_2$$

$$4Al(MnO_4)_2 \rightarrow 2Al_2O_3 + 8MnO_2 + 5O_2$$

$$4Al_4C_3 + 12 CaCO_3 + CaF_2 + 17O_2 \rightarrow 11 CaO \cdot 7Al_2O_3 \cdot CaF_2 + CaO \cdot Al_2O_3 + 24CO_2$$

It is seen that should manganese be contained to some extent, addition of only limestone would be sufficient for the oxidation of aluminum nitride and aluminum carbide. However, in order to accelerate oxidation, it is desirable to add small amounts of manganese ore and fluorite.

The reason for the use of aluminum siliceous clay in the present invention is that when aluminous cement is manufactured from a mixture mainly comprising aluminum smelting residue and limestone, the main component of the cement may become calcium aluminate and such a cement, though useful for refractory materials, is unsuitable for civil engineering and construction purposes, being inferior in its resistance to water for a prolonged period of time. It is, therefore, necessary to add to the mixture some amount of clay (aluminum hydrosilicate) in carrying out the present invention.

The following example illustrates the process according to the present invention.

EXAMPLE

A mixture of 150 parts of aluminum smelting residue, 50 parts of limestone, 50 parts of blast furnace slag, 50 parts of converter slag, 30 parts of clay, 3 parts of manganese carbonate and 3 parts of fluorite was mixed by the dry process and finely crushed. Then, the crushed mixture was transferred to a rotary kiln to be burned at a temperature of 1,400° C to produce a clinker. After checking, the clinker exhibited a nearly white color and was hard and well combined without any free lime being observed. The product was finely ground to produce a powdered cement.

The finished product was subjected to a test in compliance with the Japan Industrial Standard R 2511, "The Aluminous Cement for Refractory Materials," and it was found that the time for its initial setting was 95 minutes and for its final setting was 170 minutes. As regards its strenths, the bending strength was 72Kg/cm.$^2$ per day and the compression strength was 450Kg/cm.$^2$ The product also met all the other requirements and proved to be an excellent cement.

It will be appreciated that the limestone used in the process according to the present invention may be substituted with blast furnace slag or converter slag and the aluminum siliceous clay may be substituted with aluminum siliceous rock. These substitutions are mere replacements of raw materials and are, therefore, to be included in the technical scope of the present invention, because there is contained 0.2 to 2.2% MnO in blast furnace slag and 3% MnO in converter slag with a small amount of $CaF_2$ and also because the former contains 35 to 45% CaO and the latter contains 45 to 55% CaO so that both slags can be quite suitable as sources of lime. Further, the $SiO_2$, $Al_2O_3$ and MnO as contained in the slags, if not excessive, are favorable for the manufacture of aluminous cement according to the present invention. As regards the substitution of aluminum siliceous rock for aluminum siliceous clay, it is apparent that both are essentially same in quality.

As described above, the present invention has various advantages and industrial effects in that the aluminum smelting residue which has hitherto been in no way used but disposed of as waste can be used and the product manufactured therefrom by the present invention can be utilized in the fields of civil engineering and construction without causing any public hazards.

What is claimed is:

1. A process for the manufacture of aluminous cement from aluminum smelting residue, which comprises the steps of:
    preparing a mixture of 150 parts of aluminum smelting residue containing at least one of aluminum carbide and aluminum nitride, 50 parts of limestone, 50 parts of blast furnace slag, 50 parts of converter slag, and 30 parts of aluminum hydrosilicate;
    crushing said mixture;
    burning said crushed mixture to form a clinker; and powdering said clinker to form the aluminous cement.

2. A process according to claim 1, in which the mixture is also prepared with fluorite and manganese ore thereby to accelerate said oxidation.

3. A process according to claim 1, in which said burning is at temperatures in the range of 1300° C to 1500° C.

* * * * *